(12) United States Patent
Kuo et al.

(10) Patent No.: US 9,411,185 B2
(45) Date of Patent: Aug. 9, 2016

(54) SPLICING BACKPLANE FOR BACKLIGHT MODULE AND BACKLIGHT MODULE EMPLOYING SAME

(71) Applicant: SHENZHEN CHINA STAR OPTOELECTRONICS TECHNOLOGY CO., LTD., Shenzhen, Guangdong (CN)

(72) Inventors: Yi Cheng Kuo, Guangdong (CN); Yuchun Hsiao, Guangdong (CN); Yanxue Zhang, Guangdong (CN)

( * ) Notice: Subject to any disclaimer, the term of this patent is extended or adjusted under 35 U.S.C. 154(b) by 0 days.

(21) Appl. No.: 13/983,776

(22) PCT Filed: Jun. 30, 2013

(86) PCT No.: PCT/CN2013/078530
§ 371 (c)(1),
(2) Date: Aug. 6, 2013

(87) PCT Pub. No.: WO2014/201721
PCT Pub. Date: Dec. 24, 2014

(65) Prior Publication Data
US 2016/0139448 A1    May 19, 2016

(30) Foreign Application Priority Data

Jun. 20, 2013 (CN) .......................... 2013 1 0248141

(51) Int. Cl.
*G02F 1/1333* (2006.01)
(52) U.S. Cl.
CPC ............... *G02F 1/133308* (2013.01); *G02F 2001/133314* (2013.01); *G02F 2001/133328* (2013.01)
(58) Field of Classification Search
CPC .............. G02F 1/133308; G02F 2001/133314; G02F 2001/133328
See application file for complete search history.

(56) References Cited

U.S. PATENT DOCUMENTS

2006/0109616 A1\*   5/2006   Lee ................... G02F 1/133308
361/679.22

FOREIGN PATENT DOCUMENTS

| CN | 1662124   | A | 8/2005 |
| CN | 1893784   | A | 1/2007 |
| CN | 102272662 | A | 12/2011 |
| CN | 102734763 | A | 10/2012 |
| JP | 2004-317919 | A | 11/2004 |
| JP | 2005234180 | A | 9/2005 |
| JP | 2007298670 | A | 11/2007 |

OTHER PUBLICATIONS

Liu YaLi, the International Searching Authority written comments,Mar. 2014, CN.

\* cited by examiner

*Primary Examiner* — Elmito Breval

(57) ABSTRACT

The invention provides a splicing backplane for a backlight module, which is arranged on the backside of the backlight module. The splicing backplane comprises a mounting portion and a supporting portion, wherein the horizontal height of the mounting portion is level with or lower than that of the supporting portion; and a plurality of the splicing backplanes are assembled together by the mutual superposition of various mounting portions. A plurality of the splicing backplanes are superposed with each other and combined into one, and the height differences between the mounting portions and the supporting portions of two adjacent backplanes are unequal, so that one backplane can be accommodated into the other backplane. In addition, after the superposition, the overall thickness of the backplanes is invariable.

17 Claims, 2 Drawing Sheets

100

400

500

SPLICING BACKPLANE FOR BACKLIGHT MODULE AND BACKLIGHT MODULE EMPLOYING SAME

FIELD OF THE INVENTION

The invention relates to a backlight module, in particular to a splicing backplane applicable for supporting the backlight module.

BACKGROUND OF THE INVENTION

With the development of LCD technology, the production of large-size liquid-crystal-display televisions (LCD TV) and modules has become a trend. In large-size backlight modules, due to the relatively large size, backlight backplanes are hard to be subjected to one-step punch forming, so that two or more sets of moulds are usually adopted for the punch forming of a plurality of accessories to complete assembly. In addition, due to the relatively large weight of the large-size LCD modules, the splicing mode of the backplanes is particularly important and directly affects the reliability and the economy of the backplanes.

Therefore, it's necessary to provide a splicing backplane for a backlight module, having the advantages of simple structure, easy assembly and steady support.

SUMMARY OF THE INVENTION

In order to achieve the objective, the invention provides a splicing backplane for a backlight module, arranged on the backside of the backlight module. The splicing backplane comprises a mounting portion and a supporting portion, wherein the horizontal height of the mounting portion is level with or lower than that of the supporting portion; and a plurality of the splicing backplanes are assembled together by the mutual superposition of various mounting portions.

Preferably, a stepped surface is formed between the mounting portion and the supporting portion of the backplane; and the height difference of the stepped surface of one backplane between adjacent backplanes is more than that of the stepped surface of the other backplane. In addition, the height differences of the stepped surfaces between the mounting portions and the supporting portions of the adjacent backplanes are twice of each other, and the inclination angle of the stepped surfaces is between 90 and 150 degrees. Therefore, the overall thickness of the mutually superposed backplanes in pairs is invariable, and thus the smoothness can be guaranteed.

Preferably, for the further fixing of the mounting portions, the mounting portions are assembled together by a fastener. When the fastener is arranged on side faces of the mounting portions, end portions of the fastener are fastened onto surfaces of the mounting portions to assemble both the mounting portions together. In addition, the horizontal height of the end portions is lower than or level with that of the supporting portions.

Preferably, in order to reinforce the overall intensity of the splicing backplane, a plurality of reinforced edges are projected on the backplane and staggered to form a frame body so as to reinforce the intensity of two splicing backplanes.

Preferably, horizontal reinforcing supports and vertical reinforcing supports may be also additionally arranged on the backside of the splicing backplane and are respectively provided with a plurality of clamping grooves. By the mutual clamping of the clamping grooves and the reinforced edges of the backplane, the horizontal reinforcing supports and the vertical reinforcing supports are arranged on the backside of the backplane to further reinforce the overall intensity of the splicing backplane. In addition, the vertical reinforcing supports and the horizontal reinforcing supports are staggered and superposed with each other to form a frame body structure, symmetrically arranged in the middle of the backside of the splicing backplane, and arranged on the backplane by screws.

Preferably, one splicing backplane is superposed with the other splicing backplane, and the mutually superposed mounting portions of the two splicing backplanes are staggered in such a way that upper portions and lower portions of the splicing backplanes are balanced.

The invention also provides a backlight module, wherein the backlight modules are combined into one by the mutual superposition of splicing backplanes on the backsides of the backlight modules; the splicing backplane comprises a mounting portion and a supporting portion; the horizontal height of the mounting portion is level with or lower than that of the supporting portion; and a plurality of the splicing backplanes are assembled together by the mutual superposition of various mounting portions. Preferably, a stepped surface is formed between the mounting portion and the supporting portion of the backplane, and the height difference of the stepped surface of one backplane between adjacent backplanes is more than that of the stepped surface of the other backplane.

Compared with the prior art, a plurality of the splicing backplanes are superposed with each other and combined into one, and the height differences between the mounting portions and the supporting portions of two adjacent backplanes are unequal, so that one backplane can be accommodated into the other backplane; and meanwhile, after the superposition, the overall thickness of the backplanes is invariable. In addition, by adoption of the fastener to fix the two superposed backplanes together, the splicing backplane for the backlight module has the advantages of not destroying the structure of the backplanes, being convenient in assembly and disassembly, reducing the splicing difficulty and the production cost and improving the assembly efficiency and the product yield. Moreover, by the mutual superposition of a plurality of the backplanes, a large-size backplane is not required to be prepared. Furthermore, due to the splicing structure, the supporting intensity of the backplane may be also improved. Meanwhile, the horizontal reinforcing supports and the vertical reinforcing supports which are mutually staggered are additionally arranged and integrated into a whole with the backplane so as to further reinforce the overall intensity of the backplane.

DETAILED DESCRIPTION OF THE PREFERRED EMBODIMENTS

Figure 1:
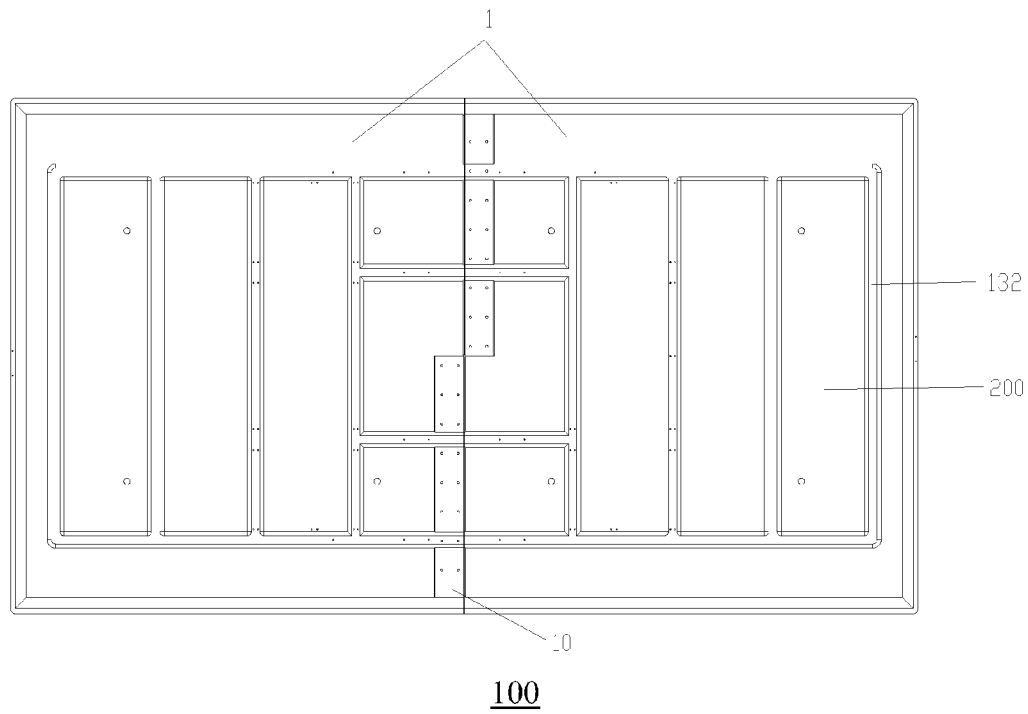
FIG. 1 is an overall view of a first embodiment of a splicing backplane for a backlight module, provided by the invention.
Figure 2:
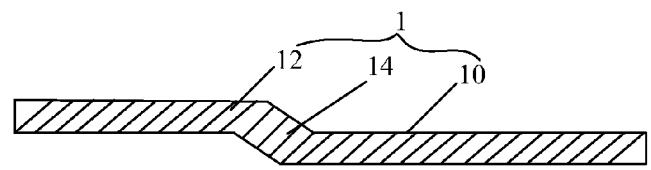
FIG. 2 is a schematic view of a single backplane of the splicing backplane for the backlight module, provided by the invention.

As illustrated in FIGS. 1 and 2, the invention provides a splicing backplane 100 for a backlight module, which is arranged on the backside of the backlight module 200. The splicing backplane 100 comprises a mounting portion 10 and a supporting portion 12, wherein the horizontal height of the mounting portion 10 is level with or lower than that of the supporting portion 12; and a plurality of the splicing backplanes 100 are assembled together by the mutual superposition of various mounting portions 10.

The splicing backplane 100, taken as a supporting mechanism for the large-size backlight module 200, is arranged on the backside of the backlight module 200, formed by the mutual superposition and splicing of a plurality of sets of spliced backplanes 1, and used for supporting the whole backlight module 200 by the extension of a plurality of sets of the spliced backplanes 1. As such, a large-size backplane 1 is not required to be formed to support the backlight module, and the backplane formed by partitioning has the advantages of small size, easy forming, more steady combined support, uniform force exertion and incapability of being easily deformed.

Figure 3:
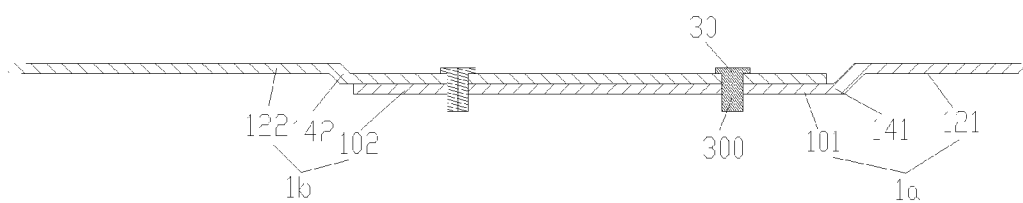
FIG. 3 is an assembly drawing illustrating the state after the superposition of the backplanes of the splicing backplane for the backlight module, provided by the invention.

As illustrated in FIGS. 2 and 3, a mutually superposed part of two adjacent backplanes 1 is taken as the mounting portion 10, and the other part is taken as the supporting portion 12; a stepped surface 14 is formed between the mounting portion 10 and the supporting portion 12 of the backplane 1 and is at a right angle; and the horizontal height of the mounting portion 10 is lower than that of the supporting portion 12, namely the height difference of the stepped surface of one backplane between the adjacent backplanes is more than that of the stepped surface of the other backplane. Supposing that the two adjacent superposed backplanes are a first backplane 1a and a second backplane 1b, a first mounting portion 101 of the first backplane 1a is lower than a first supporting portion 121 thereof; a first stepped surface 141 is formed between the first mounting portion 101 and the first supporting portion 121 in the first backplane 1a; a second mounting portion 102 of the second backplane 1b is lower than a second supporting portion 122 thereof; and a second stepped surface 142 is formed between the second mounting portion 102 and the second supporting portion 122 in the second backplane 1b. Moreover, when the first backplane 1a is superposed with the second backplane 1b, the height difference between the first mounting portion 101 and the first supporting portion 121 of the first backplane 1a is more than that between the second mounting portion 102 and the second supporting portion 122 of the second backplane 1b, namely the height difference of the first stepped surface 141 is more than that of the second stepped surface 142, so that the second backplane 1b is superposed on the first stepped surface 141 of the first backplane 1a during the mutual superposition of the two backplanes. At this point, the first mounting portion 101 and the second mounting portion 102 are aligned and superposed with each other, and thus the first backplane 1a and the second backplane 1b are assembled together. In addition, due to the arrangement of the stepped surfaces, the overall projection of the splicing backplane cannot be caused by the mounting portions, and thus the smoothness of the whole splicing backplane 1 can be guaranteed.

Preferably, the height differences of the stepped surfaces 14 between the mounting portions 10 and the supporting portions 12 of the adjacent backplanes are twice of each other, so that the thickness of the splicing backplane after assembly is relatively small. Moreover, the inclination angle of the stepped surfaces is between 90 and 150 degrees.

For better fixing of the two backplanes together, when the adjacent backplanes are superposed with each other, a fastener 300 must be sleeved into side faces of the mounting portions to assemble the two mounting portions together. Preferably, the fastener 300 is a screw; end portions 30 at both ends of the fastener 300 extend inwards; the fastener 300 is fastened onto the second mounting portion 102 through an inner end portion 30; and the horizontal height of the inner end portion 30 is lower than or level with that of the supporting portion. As such, the two mounting portions are fastened and fixed together. By adoption of the fastener with the structure for assembly, the backplanes are convenient in assembly and disassembly without destroying the structure thereof.

In order to achieve more steady overall structure of the splicing backplane, a plurality of reinforced edges 132 are projected on the backplane 1. The reinforced edges 132 are staggered to form a frame body so as to reinforce the intensity of the backplane.

Figure 4:
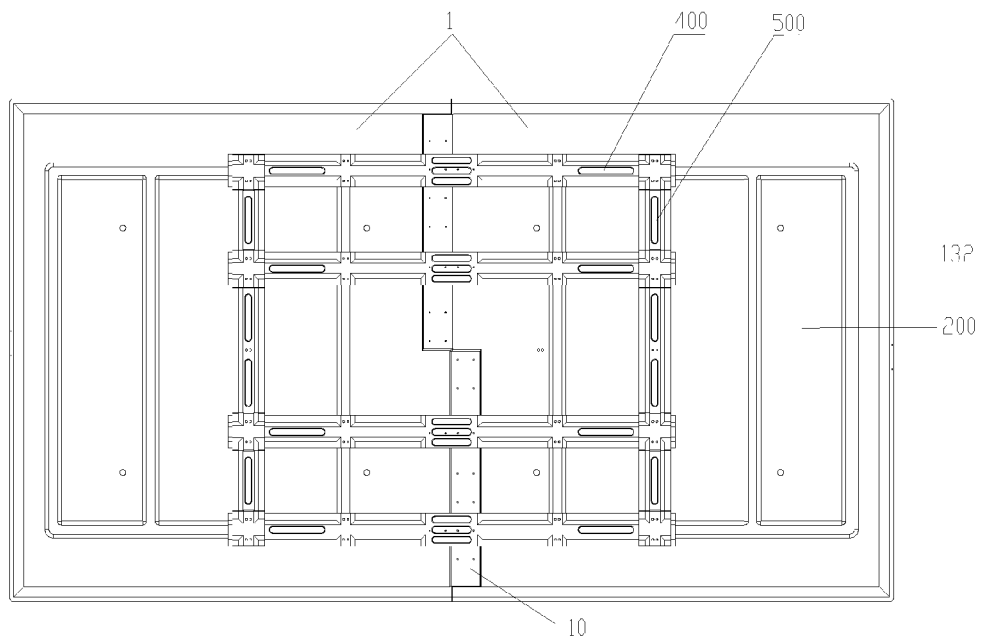
FIG. 4 is an overall view of a second embodiment of the splicing backplane for the backlight module, provided by the invention.
Figure 5:
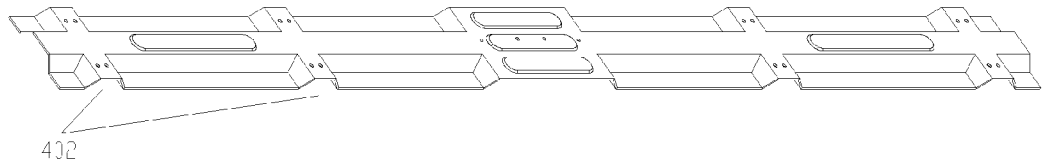
FIG. 5 is a schematic structural view of a horizontal backplane support of the splicing backplane for the backlight module, provided by the invention.
Figure 6:
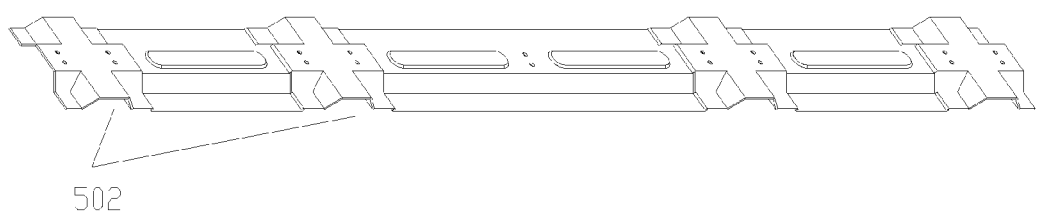
FIG. 6 is a schematic structural view of a vertical backplane support of the splicing backplane for the backlight module, provided by the invention.

As illustrated in FIGS. 4 to 6, in order to further reinforce the intensity of the splicing backplane, horizontal reinforcing supports 400 are additionally arranged on the backside of the splicing backplane to reinforce the intensity of the backplane in the horizontal direction, are parallel to a major axis of the splicing backplane, and are respectively provided with a plurality of clamping grooves 402. By the mutual clamping of the clamping grooves 402 and the reinforced edges 132 of the backplane 1, the horizontal reinforcing supports 400 are arranged on the backside of the backplane 1. Moreover, various clamping grooves 402 are parallel to each other, are cross-shaped, and are correspondingly arranged according to the distribution spacing of the reinforced edges 132. Furthermore, a plurality of the horizontal reinforcing supports 400 are arranged in the middle of the backside of the backplane.

As illustrated in FIG. 1, as the overall structure of the splicing backplane for the backlight module is large, the problem of center-of-gravity offset may be caused in the case of superposition on the same side. In order to achieve balanced and steady overall structure of the splicing backplane, one splicing backplane is superposed with the other splicing backplane, and the mutually superposed mounting portions of the two splicing backplanes are staggered in such a way that upper portions and lower portions of the splicing backplanes are balanced, and thus the problem of imbalance due to the problem of center-of-gravity offset can be avoided.

In order to further fix the whole splicing backplane, vertical reinforcing supports 500 are additionally arranged on the backside of the splicing backplane to reinforce the intensity of the backplane in the vertical direction. The vertical reinforcing supports 500 and the horizontal reinforcing supports 400 are staggered and superposed with each other to form a frame body structure. In the embodiment, the vertical reinforcing supports 500 and the horizontal reinforcing supports 400 are symmetrically arranged on the backside of the splicing backplane, wherein the vertical reinforcing supports 500 are arranged at the bottom of the horizontal reinforcing supports 400; each vertical reinforcing support 500 is provided with a plurality of clamping grooves 502; and by the mutual clamping of the clamping grooves 502 and the reinforced edges 132 of the backplane 1, the vertical reinforcing supports 500 are arranged on the backside of the backplane 1. In the embodiment, the number of the vertical reinforcing supports 500 is 6. The overall intensity of the splicing backplane can be further reinforced by the mutual staggering and superposition of the horizontal reinforcing supports 400 and the vertical reinforcing supports 500.

During the assembly, firstly, the two splicing backplanes 1 to be assembled are mutually superposed and the two mounting portions 10 are mutually superposed; secondly, the fastener 300 is used for locking the two mounting portions together on the side faces thereof; thirdly, a plurality of the horizontal reinforcing supports 400 are arranged on the backside of the backplane 1 to reinforce the intensity of the backplane in the horizontal direction, and the vertical reinforcing supports 500 are arranged on the horizontal reinforcing supports 400; and fourthly, all the reinforcing supports are integrally arranged and fixed on the backplane by screws to reinforce the overall intensity of the backplane.

What is claimed is:

1. A splicing backplane for a backlight module, arranged on the backside of the backlight module, wherein the splicing backplane comprises a mounting portion and a supporting portion; the horizontal height of the mounting portion is level with or lower than that of the supporting portion; a plurality of the splicing backplanes are assembled together by the mutual superposition of various mounting portions; a stepped surface is formed between the mounting portion and the supporting portion of the backplane; the height difference of the stepped surface of one backplane between adjacent backplanes is more than that of the stepped surface of the other backplane; the mounting portions are combined into one through a fastener; in the case of the fastener arranged on side faces of the mounting portions, end portions of the fastener are fastened onto surfaces of the mounting portions to assemble both the mounting portions together; the horizontal height of an inner end portion of the fastener is lower than or level with that of the supporting portion; one splicing backplane is superposed with the other splicing backplane; and the mutually superposed mounting portions of the two backplanes are staggered in such a way that upper portions and lower portions of the splicing backplanes are balanced, wherein the inclination angle of the stepped surfaces is between 90 and 150 degrees.

2. The splicing backplane for the backlight module according to claim 1, wherein the height differences of the stepped surfaces between the mounting portions and the supporting portions of the adjacent backplanes are twice of each other.

3. The splicing backplane for the backlight module according to claim 1, wherein the two splicing backplanes have identical thickness when assembled together.

4. The splicing backplane for the backlight module according to claim 1, wherein a plurality of reinforced edges are projected on the backplane and staggered to form a frame body.

5. The splicing backplane for the backlight module according to claim 1, wherein the inclination angle of the stepped surfaces is 120 degrees.

6. A splicing backplane for a backlight module, arranged on the backside of the backlight module, wherein the splicing backplane comprises a mounting portion and a supporting portion; the horizontal height of the mounting portion is level with or lower than that of the supporting portion; and a plurality of the splicing backplanes are assembled together by the mutual superposition of various mounting portions, wherein the inclination angle of the stepped surface is between 90 and 150 degrees.

7. The splicing backplane for the backlight module according to claim 6, wherein a stepped surface is formed between the mounting portion and the supporting portion of the backplane; and the height difference of the stepped surface of one backplane between adjacent backplanes is more than that of the stepped surface of the other backplane.

8. The splicing backplane for the backlight module according to claim 7, wherein a plurality of reinforced edges are projected on the backplane and staggered to form a frame body.

9. The splicing backplane for the backlight module according to claim 8, wherein horizontal reinforcing supports are additionally arranged on the backside of the splicing backplane and respectively provided with a plurality of clamping grooves; and by the mutual clamping of the clamping grooves and the reinforced edges of the backplane, the horizontal reinforcing supports are arranged on the backside of the backplane.

10. The splicing backplane for the backlight module according to claim 9, wherein vertical reinforcing supports are additionally arranged on the backside of the splicing backplane, staggered and superposed with the horizontal reinforcing supports to form a frame body structure, and respectively provided with a plurality of clamping grooves; and by the mutual clamping of the clamping grooves and the reinforced edges of the backplane, the vertical reinforcing supports are arranged on the backside of the backplane.

11. The splicing backplane for the backlight module according to claim 10, wherein the vertical reinforcing supports and the horizontal reinforcing supports are symmetrically arranged in the middle of the backside of the splicing backplane and arranged on the backplane by screws.

12. The splicing backplane for the backlight module according to claim 7, wherein the mounting portions are assembled together by a fastener.

13. The splicing backplane for the backlight module according to claim 12, wherein when the fastener is arranged on side faces of the mounting portions, end portions of the fastener are fastened onto surfaces of the mounting portions to assemble both the mounting portions together; and the horizontal height of an inner end portion of the fastener is lower than or level with that of the supporting portion.

14. The splicing backplane for the backlight module according to claim 13, wherein one splicing backplane is superposed with the other splicing backplane; and the mutually superposed mounting portions of the two backplanes are staggered in such a way that upper portions and lower portions of the splicing backplanes are balanced.

15. The splicing backplane for the backlight module according to claim 6, wherein the inclination angle of the stepped surface is 120 degrees.

16. A backlight module, wherein the backlight module is combined into one by the mutual superposition of splicing backplanes on the backsides of the backlight modules; the splicing backplane comprises a mounting portion and a supporting portion; the horizontal height of the mounting portion is level with or lower than that of the supporting portion; and a plurality of the splicing backplanes are assembled together by the mutual superposition of various mounting portions, wherein the inclination angle of the stepped surfaces is between 90 and 150 degrees.

17. The splicing backplane for the backlight module according to claim 16, wherein a stepped surface is formed between the mounting portion and the supporting portion of the backplane; and the height difference of the stepped surface of one backplane between adjacent backplanes is more than that of the stepped surface of the other backplane.

* * * * *